(12) United States Patent
Bojsen

(10) Patent No.: US 9,187,024 B2
(45) Date of Patent: Nov. 17, 2015

(54) HEADER TRAILER WITH IMPROVED STEERING

(71) Applicant: AGCO A/S, Hesston, KS (US)

(72) Inventor: Thomas Mygind Bojsen, Randers (DK)

(73) Assignee: AGCO A/S, Randers (DK)

(*) Notice: Subject to any disclaimer, the term of this patent is extended or adjusted under 35 U.S.C. 154(b) by 0 days.

(21) Appl. No.: 14/501,411

(22) Filed: Sep. 30, 2014

(65) Prior Publication Data

US 2015/0091274 A1 Apr. 2, 2015

(30) Foreign Application Priority Data

Oct. 1, 2013 (GB) .................................. 1317374.5

(51) Int. Cl.
*B60P 3/40* (2006.01)
*A01D 75/00* (2006.01)
*B62D 13/02* (2006.01)
*B62D 13/04* (2006.01)

(52) U.S. Cl.
CPC ................. *B60P 3/40* (2013.01); *A01D 75/002* (2013.01); *B62D 13/02* (2013.01); *B62D 13/04* (2013.01)

(58) Field of Classification Search
CPC ............................... B62D 13/00; B62D 13/025
USPC ....................................................... 280/442
See application file for complete search history.

(56) References Cited

U.S. PATENT DOCUMENTS

| 4,603,873 | A | * | 8/1986 | Perlini | 180/409 |
|---|---|---|---|---|---|
| 5,364,116 | A | * | 11/1994 | Houle et al. | 280/442 |
| 5,857,831 | A | | 1/1999 | Wilson | |
| 6,050,586 | A | * | 4/2000 | Wilson | 280/475 |
| 8,033,376 | B2 | * | 10/2011 | Toews et al. | 198/300 |
| 2005/0077703 | A1 | * | 4/2005 | Tango | 280/442 |
| 2005/0121878 | A1 | * | 6/2005 | Muldoon | 280/426 |
| 2009/0236823 | A1 | * | 9/2009 | Prem et al. | 280/426 |
| 2011/0079487 | A1 | | 4/2011 | Toews | |
| 2013/0175785 | A1 | * | 7/2013 | Renders | 280/426 |

FOREIGN PATENT DOCUMENTS

DE 102011007943 A1 7/2012

OTHER PUBLICATIONS

Intellectual Property Office, Search Report for UK Application No. GB1317374.5, dated Apr. 14, 2014.

* cited by examiner

*Primary Examiner* — Tony Winner
*Assistant Examiner* — Michael Stabley

(57) ABSTRACT

A trailer for transporting a harvester header comprises a chassis, a rear axle assembly and a front axle assembly. A steering force transfer mechanism is arranged to transfer a steering force hydraulically from a first one steerable wheel supported on the front axle assembly to a second one steerable wheel supported on the rear axle assembly. A steering movement of the first one steerable wheel to one side effects a steering movement of the second one steerable wheel to the opposite side.

13 Claims, 5 Drawing Sheets

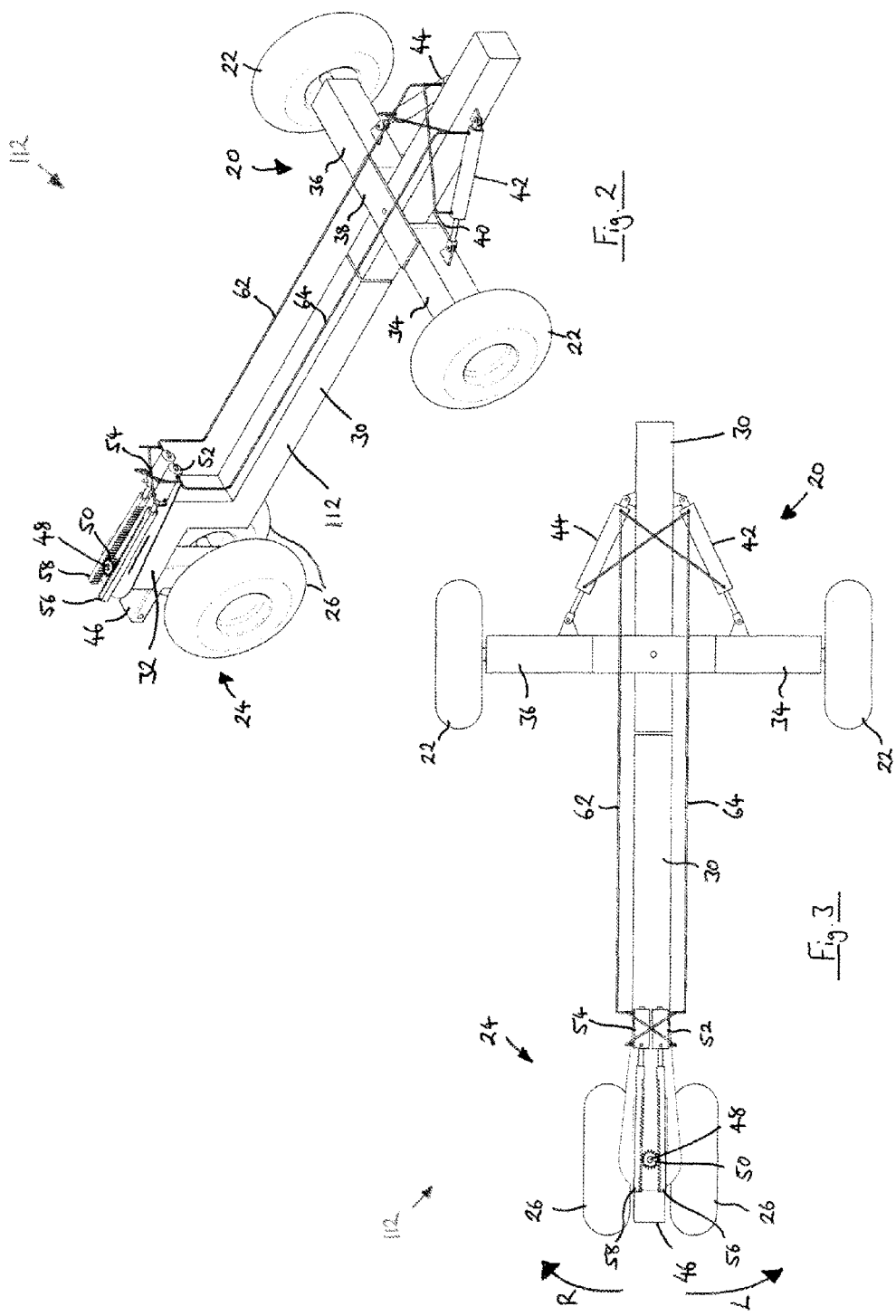

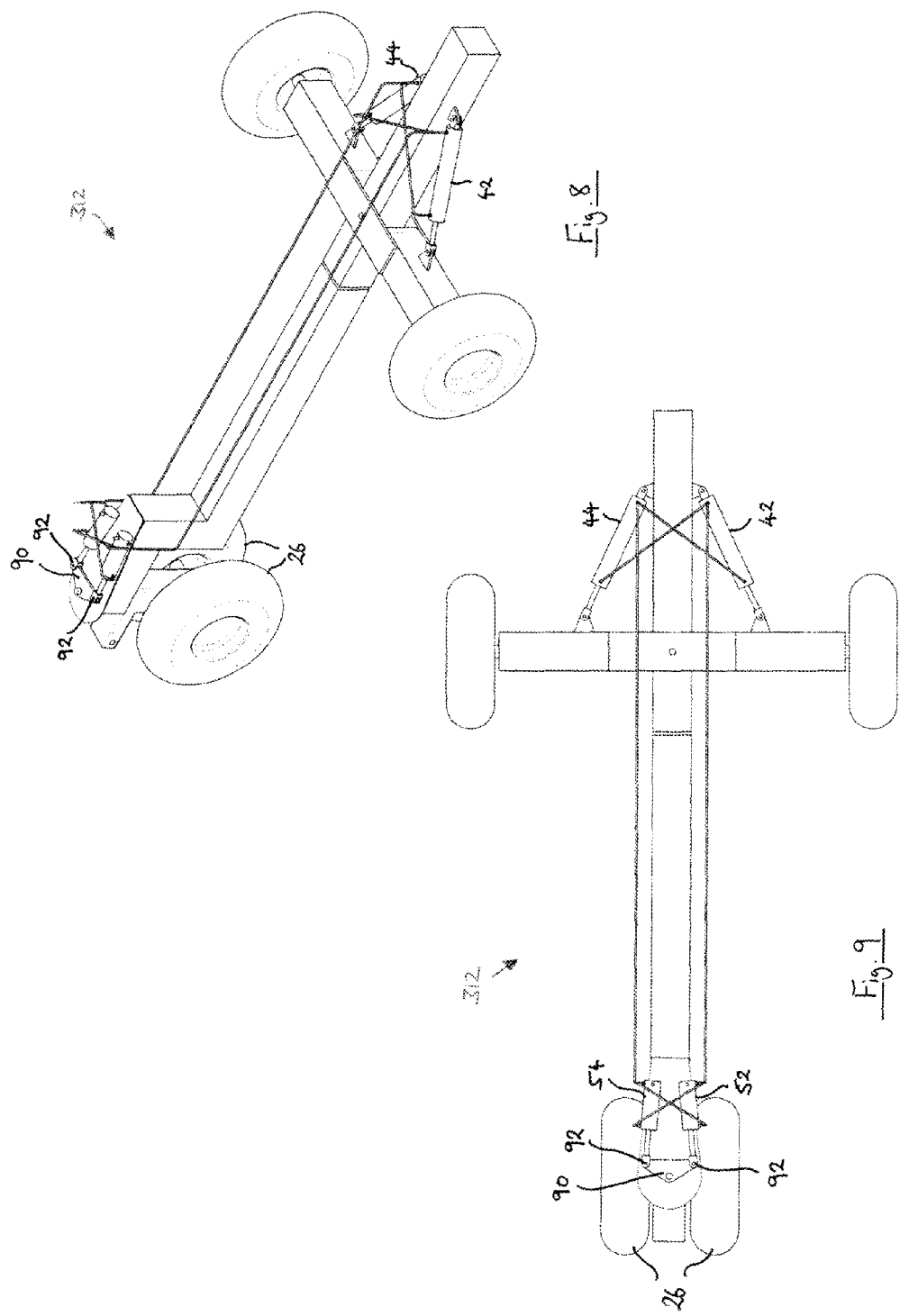

HEADER TRAILER WITH IMPROVED STEERING

BACKGROUND OF THE INVENTION

1. Field of invention

The invention relates to trailers suitable for transporting harvester headers.

2. Background

As self-propelled harvesting machines get larger to cater for the demands of modern farmers, the headers become wider too. It is well known to detach the header of, say, a combine harvester when moving from field to field, especially when travelling on roads is required, due to the excessive width. For the transport operation, a dedicated header trailer is typically employed to carry the header lengthwise.

FIG. 1 schematically represents a combine harvester 10 towing a header trailer 12 on top of which is shown the detached harvester header 14. Although shown as being towed by a combine 10 it will be appreciated that the header trailer may be towed by any suitable vehicle, most commonly an agricultural tractor.

The example header trailer 12 shown includes a chassis 16 with a front towing hitch 18 for attachment to the towing vehicle 10 and a rear axle assembly 20 which supports a pair of rear wheels 22. A front axle assembly 24 comprises a pony truck which is provided to support one or more front wheels 26. The provision of one or more front wheels 26 maintains the chassis 16 at a constant level to ease attachment and detachment of the header 14 from the feeder house 28 of combine 10. Furthermore, the provision of front pony truck reduces the vertical load on the front hitch 18 thus placing less strain on primitive towing hitches often provided at the rear of combine harvesters.

Harvester headers today can reach operating widths of up to 15 meters which require long header trailers in the region of 18 meters in length. The lengths involved can make manoeuvrability and particularly tight turns troublesome because the rear wheels 22 of the header trailer 12 take the shortest route when following the towing machine.

SUMMARY OF INVENTION

It is an object of the invention therefore to provide a header trailer with improved manoeuvrability.

In accordance with the invention there is provided a harvester header trailer, the trailer comprising a chassis, at least three steerable wheels each supported on one of a rear axle assembly and a front axle assembly, and a steering force transfer mechanism arranged to transfer a steering force hydraulically from a first one steerable wheel supported on the front axle assembly to a second one steerable wheel supported on the rear axle assembly, wherein a steering movement of the first one steerable wheel to one side effects a steering movement of the second one steerable wheel to the opposite side.

Steering movement of the front steerable wheel generates a steering force which is transferred to the rear axle assembly which, in turn, causes a steering movement of at least one rear wheel. Advantageously, the rear of the trailer is steered in the opposite direction to the front of the trailer causing the trailer to more closely follow the path of the towing vehicle. This, advantageously, improves the manoeuvrability of the header trailer thus allowing tighter turns to be executed.

In a preferred arrangement the steering force transfer mechanism comprises a first hydraulic cylinder mechanically coupled to a first linkage associated with the first one steerable wheel and a second hydraulic cylinder coupled to a second linkage associated with the second one steerable wheel, wherein each side of the first hydraulic cylinder is in hydraulic communication with a respective side of the second hydraulic cylinder. In its simplest construction a closed hydraulic circuit is provided wherein movement of the first hydraulic cylinder generates movement in the second hydraulic cylinder. This equates to steering movement of a front wheel forcing steering movement of a rear wheel.

The front axle assembly is preferably mounted to the chassis about a vertical steering axis by a front king pin. The first hydraulic cylinder may be coupled to the king pin via the first linkage such that rotational movement of the king pin is converted into substantially linear movement of a piston within the first hydraulic cylinder.

A further hydraulic cylinder may be associated with the front wheel(s) and mechanically coupled to the first linkage wherein rotational movement of the king pin is converted into substantially linear movement of a piston within the further hydraulic cylinder. When provided, the two front hydraulic cylinders are preferably in communication with one another wherein each side of the first hydraulic cylinder is in hydraulic communication with a respective side of the further hydraulic cylinder. Advantageously, the steering force of the front steerable wheel(s) is converted into a hydraulic force by both front hydraulic cylinders, the hydraulic force being transferred to the rear axle assembly.

At the front of the trailer, the first linkage may be arranged so that extension of the first hydraulic cylinder is accompanied by contraction of the third hydraulic cylinder and vice versa. Advantageously, this allows the first and third hydraulic cylinders to be arranged side by side either side of the vertical king pin.

The first linkage may comprise a rack and pinion arrangement wherein a pinion is mounted on the king pin and a rack is coupled to the first, and if provided third, hydraulic cylinders. Alternatively, the first linkage may comprise a crank coupled between the king pin and the hydraulic cylinder.

The front axle assembly preferably comprises a pony truck mounted to the chassis. In this case the pony truck may support the weight of the front end of the trailer chassis and be pivotally mounted thereunder around the vertical king pin. The pony truck preferably comprises a towing hitch offset from the front steering axis. The towing hitch or drawbar is of an adequate length to provide sufficient clearance between the rear of the towing machine (which may be a combine harvester) and the header supported on the trailer.

In an alternative arrangement to the pony truck the front axle assembly may comprise a front axle and two wheels supported on the front axle, wherein the front axle is pivotally mounted to the chassis about a front king pin.

The steering force transfer mechanism may comprise a fourth hydraulic cylinder coupled to a linkage associated with a rear steerable wheel, wherein the second and fourth cylinders are in hydraulic communication with one another and wherein each side of the second hydraulic cylinder is in hydraulic communication with a respective side of the fourth hydraulic cylinder. In this case, movement of the second hydraulic cylinder is accompanied by movement of the fourth hydraulic cylinder.

The rear axle assembly may comprise a rear steerable axle pivotally mounted about a pivot axis that resides on a longitudinal centre line of the trailer, the rear steerable axle supporting a pair of rear wheels. Alternatively, the rear axle assembly may comprise a pair of independent axles each supporting a respective rear steerable wheel and being pivotally mounted to the chassis by a respective rear king pin, each of the second and fourth hydraulic cylinders being connected between the chassis and a respective one of the independent rear axles to control steering of the rear steerable wheels.

BRIEF DESCRIPTION OF DRAWINGS

Further advantages of the invention will become apparent from reading the following description of specific embodiments of the invention with reference to the appended drawings in which:

FIG. 2 is a left top rear perspective view of a header trailer in accordance with a first embodiment of the invention;

FIG. 3 is a plan view of the header trailer of FIG. 2;

FIG. 8 is a left top rear perspective view of a header trailer in accordance with a third embodiment of the invention, and FIG. 9 is a plan view of the header trailer of FIG. 8.

DESCRIPTION OF EXAMPLE EMBODIMENTS

Figure 1:
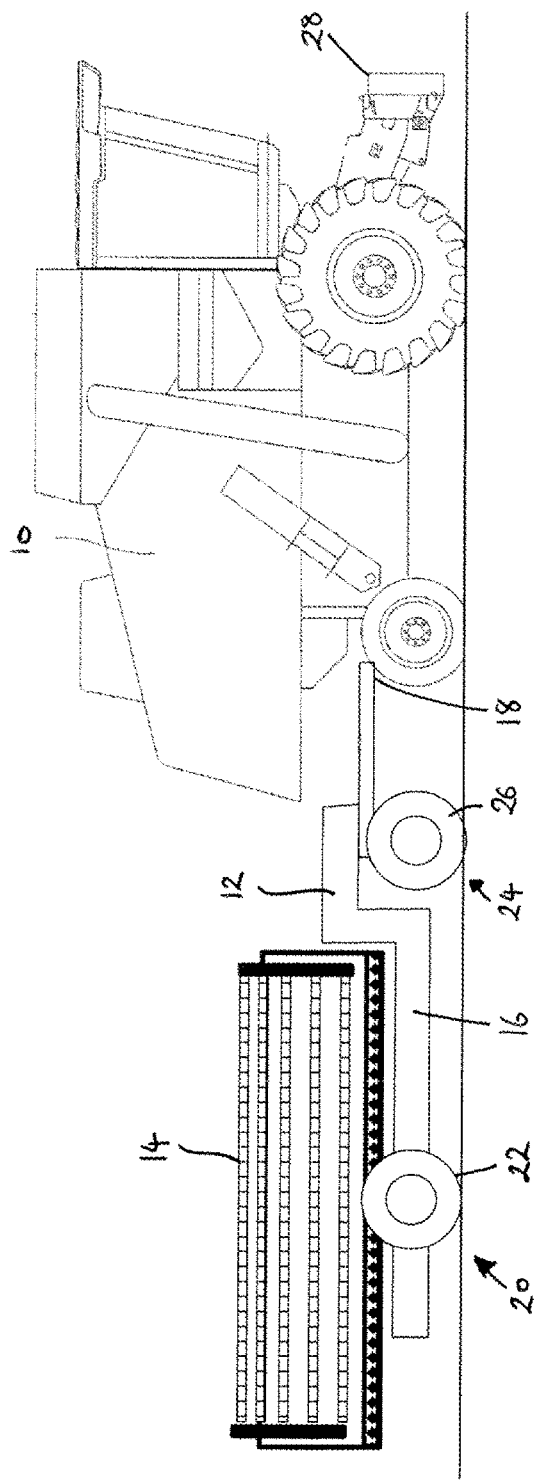
FIG. 1 shows a combine harvester towing a header trailer loaded with a combine header.

As described above, FIG. 1 shows a combine harvester 10 towing a header trailer 12. A harvester header 14 is illustrated schematically on top of the trailer 12 for transport. During operation in the field the header 14 is attached to the feederhouse 28 at the front of the combine 10 by suitable attachment means.

The trailer 12 comprises a chassis 16, rear axle assembly 20 and front axle assemble in the form of a pony truck 24.

The embodiments described hereinafter with reference to FIGS. 2-9 adopt the same basic components and construction as those of the trailer illustrated in FIG. 1.

With reference to FIGS. 2 and 3, a trailer 112 according to a first embodiment comprises a chassis 16 comprising a longitudinal centre beam 30 which includes a raised section 32 at the front end. The longitudinal beam 30 may be formed of any suitable rigid material, typically square section steel.

Rear axle assembly 20 includes a left-hand axle 34 and right-hand axle 36 each being pivotally mounted on chassis 16 about respective vertical axes and each supporting a respective rear wheel 22 at its outer end. Pivotal mounting of the independent axles 34, 36 to the chassis 16 may be by any suitable means and the simple construction shown in FIG. 2, that includes upper and lower support plates 38, 40, is by way of example only.

Providing a triangulating connection between each of the rear axles 34, 36 and the centre beam 30 is a respective hydraulic cylinder 42, 44. Taking the left-hand rear cylinder 42 as an example, each end is secured to a suitable bracket on the left-hand rear axle 34 and the longitudinal beam 30 respectively. Extension and retraction of the hydraulic cylinder 42 controls the steering angle of the left-hand rear wheel accordingly.

Right-hand rear cylinder 44 is connected to the right-hand rear axle 36 and controls steering of such in a similar manner.

Turning to the front of the trailer 112, the front axle assembly 24 comprises a pony truck 46 which is mounted under the raised portion 32 of the centre beam 30. The pony truck 46 comprises a frame member having an upturned L-shape structure, the vertical part of which supports at its lower end a front axle which itself supports a pair of front wheels 26, one each side of said vertical part. A vertical king pin 48 pivotally secures the pony truck 46 to the raised section 32. The pivotal connection provided by king pin 48 allows the pony truck 46 to pivot around a vertical axis with respect to the centre beam 30 thereby providing the freedom for front wheels 26 to be steered.

The horizontal part of the L-shaped pony truck 46 extends further forward than that shown in FIGS. 2 and 3 and provides a drawbar for hitching to a towing vehicle.

It should be understood that pony truck 46 may be constructed in a variety of different ways and the L-shaped form shown is by way of example only.

King pin 48 projects above the upper surface of raised section 32. A pinion gear 50 is keyed onto the projecting part of king pin 48. Two hydraulic cylinders 52, 54 are mounted on top of the raised section 32 in a side-by-side relationship. Each cylinder 52, 54 is connected to one end of a respective elongate rack element 56, 58 which each mesh with a respective side of the pinion gear 50.

Steering movement of the pony truck 46 and front wheels 26 relative to the chassis 12 is translated into substantially linear movement of the hydraulic cylinders 52, 54 via the rack and pinion arrangement 50, 56, 58. A steering movement to the right, as indicated by arrow R in FIG. 3, forces a retraction of cylinder 54 and a corresponding extension of cylinder 52. A steering movement to the left, as indicated by arrow L, forces (via the rack and pinion arrangement) an extension of cylinder 54 and a retraction of cylinder 52.

Figure 4:
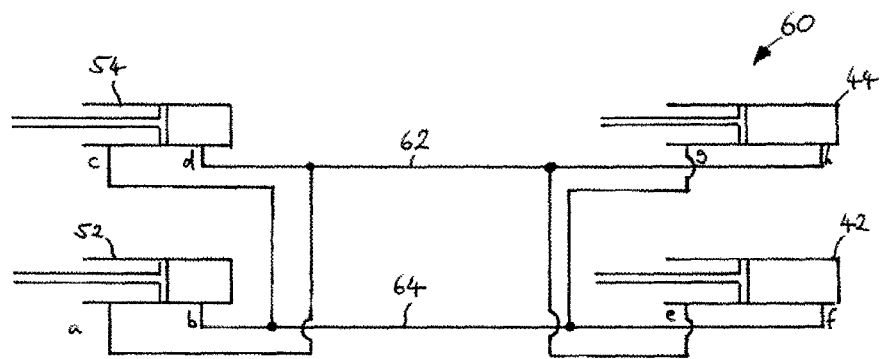
FIG. 4 shows the hydraulic circuit of the hydraulic system fitted to the header trailer of FIG. 2.

The steering movement of front wheels 26 generates a steering force which is transferred to the rear axle assembly 20 in a way that steers the rear wheels 22 in the opposite direction. A steering force transfer mechanism is provided by a hydraulic system 60 as shown in FIG. 4.

The circuit 60 includes the two rear hydraulic cylinders 42, 44 and the two front hydraulic cylinders 52, 54, all of which are two-way in operation each having a hydraulic connection either side of the associated piston. The pistons of front cylinders 52, 54 are mechanically coupled together by the rack and pinion described above wherein retraction of one cylinder is coupled with a corresponding extension of the other.

The hydraulic pressure generated by steering movement of the front wheels 26 by each of the front cylinders 52,54 is summed by hydraulically connecting the front port 'a' of cylinder 52 to the rear port 'd' of cylinder 54. The rear port 'b' of cylinder 52 is hydraulically connected to the front port 'c' of cylinder 54. The hydraulic pressure created by displacement of pistons within front cylinders 52, 54 is conveyed to the two rear cylinders 42, 44 via a pair of hydraulic lines 62, 64.

A steering movement to the right creates a positive hydraulic pressure at ports 'a' and 'd' which is conveyed via line 62 along the length of the chassis 12 to front port 'e' of left-hand cylinder 42 and to rear port 'h' of right-hand cylinder 44. Simultaneously, the negative pressure generated at ports 'b' and 'c' of front cylinders 52,54 is conveyed via hydraulic line 64 to rear port 'f' of cylinder 42 and front port 'g' of right-hand cylinder 44. The closed hydraulic circuit 60 results in a steering force being applied to the two rear wheels 22 by rear cylinders 42, 44. A retraction of left-hand cylinder 42 and extension of right-hand cylinder 44 causes the two rear axles 34, 36 to pivot thus steering the rear wheels 22 to the left.

Figure 5:
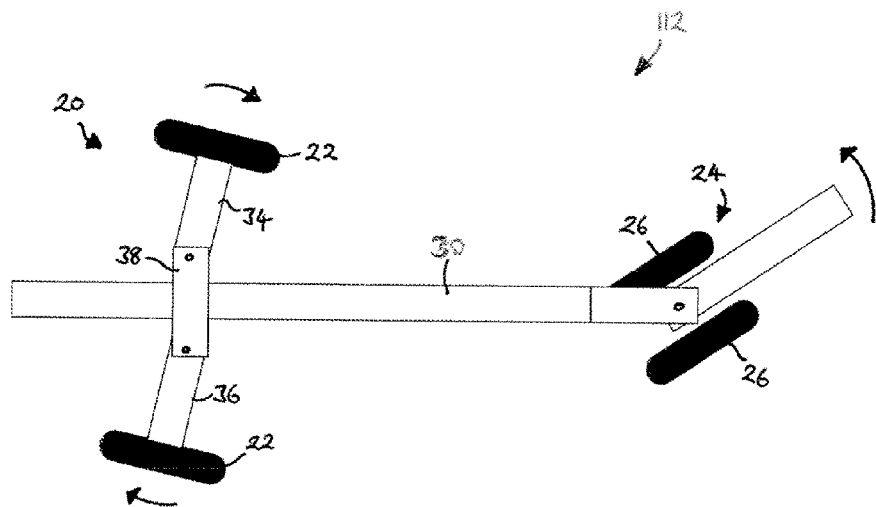
FIG. 5 is a schematic plan view of the header trailer of FIG. 2 shown when turning to the left.
Figure 6:
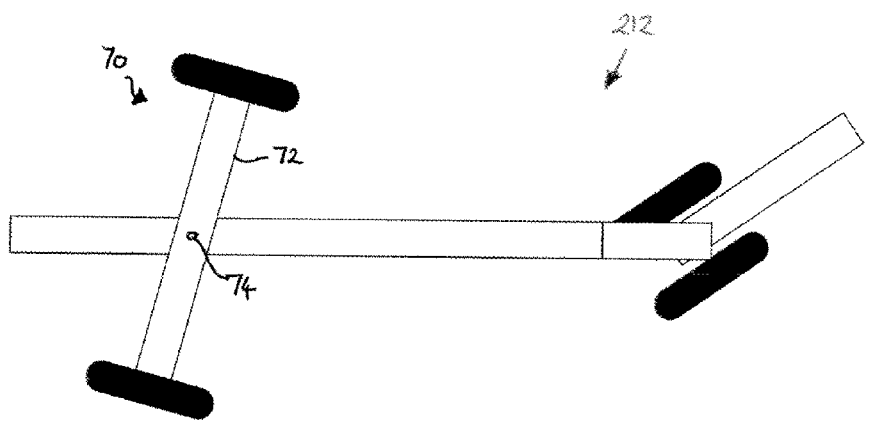
FIG. 6 is a schematic plan view of a header trailer according to a second embodiment having an alternative rear axle construction.

A steering movement of the front wheels 26 to the left has the opposite effect on rear wheels 22 which are forced to the right. FIG. 5 schematically illustrates the pivoting movement of the front axle assembly 24 to the left with the corresponding movement of rear wheels 22 and associated axles 34, 36 to the right.

Turning to the construction of the rear axle assembly 20 shown in FIGS. 2,3 and 5 it should be appreciated that alternative constructions can be adopted which still permit the rear wheels 22 to be steered with respect to the chassis. An alternative construction is shown schematically in FIG. 6 wherein a trailer 212 comprises a rear axle assembly 70 having a single axle 72 which is pivotally mounted about a pivot axis 74 that resides on a longitudinal centre line of the trailer passing through the centre beam 30 of the chassis 16. In an alternative rear axle assembly (not illustrated) a single rigid rear axle may be employed wherein each wheel 22 is pivotally mounted to the respective ends by a king pin.

The rear axle assembly 20 illustrated in FIGS. 2 and 3 have associated therewith a pair or hydraulic cylinders 42, 44. However, it is envisaged that steering of the rear wheels (or wheel) 22 may be controlled by a single hydraulic actuator connected with appropriate linkages.

Figure 7:
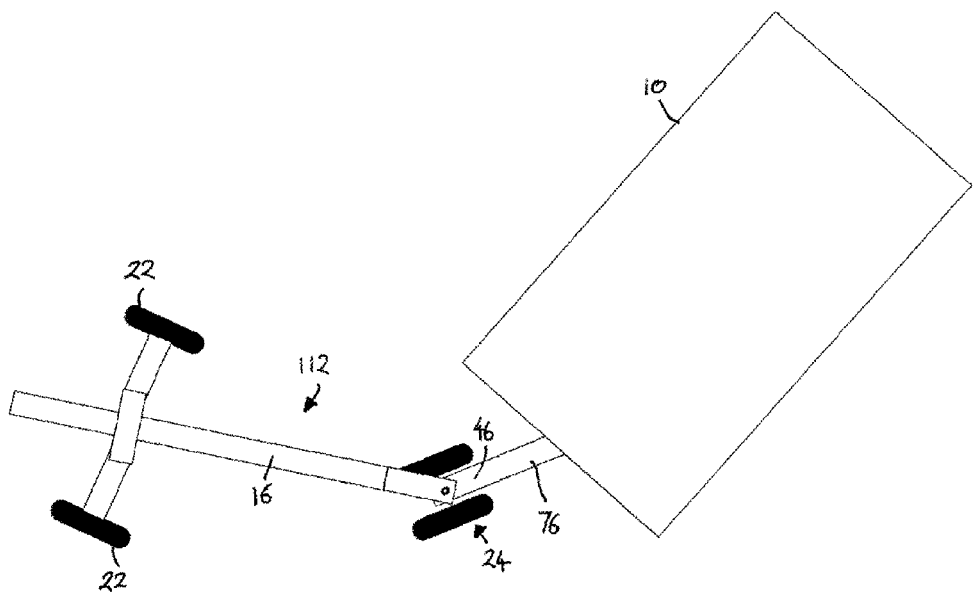
FIG. 7 is a plan schematic view of a header trailer in accordance with the first embodiment when undergoing a left-hand turn towed behind a vehicle.

In operation a drawbar 76 of trailer 112 is hitched to a towing vehicle 10 in a known manner (FIG. 7). When executing a turn to the left (as shown) the front axle assembly 24 follows the towing vehicle 10 forming an angle there between. Moreover, the pony truck 46 and attached wheels 26 are steered to the left with respect to the chassis 16, pivoting around king pin 48. The steering movement of front wheels 26 creates a steering force which is transferred via the hydraulic system 60 to cause a steering movement of the rear wheels 22 to the right.

As a result, the rear of trailer 112 more closely follows the path taken by the towing vehicle 10 and the pony truck 46. Advantageously, this makes the header trailer 112 more manoeuvrable around corners and through gateways.

In a second embodiment of the invention, shown in FIGS. 8 and 9, the rack and pinion linkage associated with the front axle assembly 24 of trailer 112 is replaced with a crank 90 keyed to the top of king pin 48. A trailer 312 has front hydraulic cylinders 52, 54 which are each connected between the chassis 16 and respective lateral sides of crank 90 by pivoting joints 92.

The effect of the alternative linkage provided by crank 90 is the same as described above wherein a steering movement of the front wheels 26 to the right forces cylinder 52 to extend and cylinder 54 to retract, the hydraulic pressure created by which is conveyed to rear cylinders 42,44.

From reading the present disclosure, other modification will be apparent to persons skilled in the art. Such modifications may involve other features which are already known in the field of header trailers and component parts therefore and which may be used instead of or in addition to features already described herein.

The invention claimed is:

1. A harvester header trailer, the trailer comprising a chassis, at least three steerable wheels each supported on one of a rear axle assembly and a front axle assembly, and a steering force transfer mechanism arranged to transfer a steering force hydraulically from a first one steerable wheel supported on the front axle assembly to a second one steerable wheel supported on the rear axle assembly, wherein a steering movement of the first one steerable wheel to one side effects a steering movement of the second one steerable wheel to the opposite side, wherein the steering force transfer mechanism comprises a first hydraulic cylinder mechanically coupled to a first linkage associated with the first one steerable wheel and a second hydraulic cylinder coupled to a second linkage associated with the second one steerable wheel, wherein each side of the first hydraulic cylinder is in hydraulic communication with a respective side of the second hydraulic cylinder, and wherein the front axle assembly is mounted to the chassis about a vertical steering axis by a front king pin.

2. A trailer according to claim 1, wherein the first linkage couples the first hydraulic cylinder to the king pin such that rotational movement of the king pin is converted into substantially linear movement of a piston within the first hydraulic cylinder.

3. A trailer according to claim 2, wherein the steering force transfer mechanism further comprises a third hydraulic cylinder mechanically coupled to the first linkage wherein rotational movement of the king pin is converted into substantially linear movement of a piston within the third hydraulic cylinder.

4. A trailer according to claim 3, wherein the first and third cylinders are in hydraulic communication with one another wherein each side of the first hydraulic cylinder is in hydraulic communication with a respective side of the third hydraulic cylinder.

5. A trailer according to claim 4, wherein the first linkage is arranged so that extension of the first hydraulic cylinder is accompanied by contraction of the third hydraulic cylinder and vice versa.

6. A trailer according to claim 2, wherein the first linkage comprises a rack and pinion arrangement wherein a pinion is mounted on the king pin and a rack is coupled to the first hydraulic cylinder.

7. A trailer according to claim 2, wherein the first linkage comprises a crank coupled between the king pin and the hydraulic cylinder.

8. A trailer according to claim 1, wherein the front axle assembly comprises a pony truck pivotally mounted to the chassis by the front king pin.

9. A trailer according to claim 8, wherein the pony truck comprises a towing hitch offset from the front steering axis.

10. A trailer according to claim 1, wherein the front axle assembly comprises a front axle and two wheels supported on the front axle, wherein the front axle is pivotally mounted to the chassis by the front king pin.

11. A harvester header trailer, the trailer comprising a chassis, at least three steerable wheels each supported on one of a rear axle assembly and a front axle assembly, and a steering force transfer mechanism arranged to transfer a steering force hydraulically from a first one steerable wheel supported on the front axle assembly to a second one steerable wheel supported on the rear axle assembly, wherein a steering movement of the first one steerable wheel to one side effects a steering movement of the second one steerable wheel to the opposite side, wherein the steering force transfer mechanism comprises a first hydraulic cylinder mechanically coupled to a first linkage associated with the first one steerable wheel and a second hydraulic cylinder coupled to a second linkage associated with the second one steerable wheel, wherein each side of the first hydraulic cylinder is in hydraulic communication with a respective side of the second hydraulic cylinder, and wherein the steering force transfer mechanism comprises a fourth hydraulic cylinder coupled to a linkage associated with a rear steerable wheel, wherein the second and fourth cylinders are in hydraulic communication with one another and wherein each side of the second hydraulic cylinder is in hydraulic communication with a respective side of the fourth hydraulic cylinder.

12. A trailer according to claim 11, wherein the rear axle assembly comprises a rear steerable axle pivotally mounted about a pivot axis that resides on a longitudinal centre line of the trailer, the rear steerable axle supporting a pair of rear wheels.

13. A trailer according to claim 11, wherein the rear axle assembly comprises a pair of independent axles each supporting a respective rear steerable wheel and being pivotally mounted to the chassis by a respective rear king pin, each of the second and fourth hydraulic cylinders being connected between the chassis and a respective one of the independent rear axles to control steering of the rear steerable wheels.

* * * * *